US009875222B2

(12) United States Patent
Denoue et al.

(10) Patent No.: US 9,875,222 B2
(45) Date of Patent: Jan. 23, 2018

(54) CAPTURING AND STORING ELEMENTS FROM A VIDEO PRESENTATION FOR LATER RETRIEVAL IN RESPONSE TO QUERIES

(75) Inventors: Laurent Denoue, Palo Alto, CA (US); Jonathan J. Trevor, Santa Clara, CA (US); David M. Hilbert, Palo Alto, CA (US); John E. Adcock, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 1777 days.

(21) Appl. No.: 12/482,315

(22) Filed: Jun. 10, 2009

(65) Prior Publication Data
US 2009/0254828 A1 Oct. 8, 2009

Related U.S. Application Data

(62) Division of application No. 10/973,698, filed on Oct. 26, 2004, now abandoned.

(51) Int. Cl.
*G06F 17/00* (2006.01)
*G06F 17/24* (2006.01)
*G06F 17/30* (2006.01)

(52) U.S. Cl.
CPC ...... *G06F 17/241* (2013.01); *G06F 17/30017* (2013.01); *G06F 17/30056* (2013.01); *G06F 17/30011* (2013.01); *G06F 17/30058* (2013.01); *G06F 17/30064* (2013.01); *G06F 17/30244* (2013.01); *G06F 17/30525* (2013.01); *G06F 17/30781* (2013.01); *G06F 17/30858* (2013.01); *Y10S 707/914* (2013.01)

(58) Field of Classification Search
CPC ............ G06F 17/241; G06F 17/30011; G06F 17/30017; G06F 17/30056; G06F 17/30064; G06F 17/30058; G06F 17/30244; G06F 17/30525; G06F 17/30781; G06F 17/30858; Y10S 707/914
USPC ................................. 715/201, 203, 230, 249
See application file for complete search history.

(56) References Cited

U.S. PATENT DOCUMENTS 5,848,409 A * 12/1998 Ahn ..................... G06F 13/4063
6,247,010 B1 * 6/2001 Doi ..................... G06F 17/30699
(Continued)

FOREIGN PATENT DOCUMENTS

| JP | 2004112379 | 9/2002 |
|----|------------|--------|
| JP | 2004185424 | 12/2002 |
| JP | 2004213095 | 12/2002 |

OTHER PUBLICATIONS

Japanese Office Action dated Jul. 28, 2011 and Japanese translation for Japanese Application No. 2005-311276.

*Primary Examiner* — Cesar Paula
*Assistant Examiner* — David Faber
(74) *Attorney, Agent, or Firm* — Sughrue Mion, PLLC

(57) ABSTRACT

Embodiments of the present invention enable the extraction, classification, storage, and supplementation of presentation video. A media system receives a video signal carrying presentation video. The media system processes the video signal and generates images for slides of the presentation. The media system then extracts text from the images and uses the text and other characteristics to classify the images and store them in a database. Additionally, the system enables viewers of the presentation to provide feedback on the presentation, which can be used to supplement the presentation.

11 Claims, 8 Drawing Sheets

(56) References Cited

U.S. PATENT DOCUMENTS

| | | | | |
|---|---|---|---|---|
| 6,332,144 B1* | 12/2001 | deVries | G06F 17/30817 | |
| 6,646,655 B1* | 11/2003 | Brandt | H04N 5/06 | 348/E5.011 |
| 6,654,735 B1* | 11/2003 | Eichstaedt | G06F 17/30867 | 707/749 |
| 7,010,751 B2* | 3/2006 | Shneiderman | G06F 17/241 | 707/999.004 |
| 7,149,755 B2* | 12/2006 | Obrador | G06F 17/30044 | |
| 7,392,469 B1* | 6/2008 | Bailin | G06F 17/241 | 715/201 |
| 7,554,576 B2* | 6/2009 | Erol | G06F 17/30244 | 348/159 |
| 2001/0020954 A1* | 9/2001 | Hull | G06F 17/30038 | 715/730 |
| 2002/0027976 A1* | 3/2002 | Wilcox | G11B 27/105 | 379/67.1 |
| 2002/0126203 A1* | 9/2002 | Yu | G06F 17/30796 | 348/61 |
| 2003/0123841 A1* | 7/2003 | Jeannin | H04N 5/76 | 386/249 |
| 2004/0071442 A1* | 4/2004 | Wells | H04N 5/765 | 386/212 |
| 2004/0113933 A1* | 6/2004 | Guler | G06K 9/00771 | 715/716 |
| 2004/0139058 A1* | 7/2004 | Gosby | G06F 17/3069 | |
| 2004/0202349 A1* | 10/2004 | Erol | G06F 17/30256 | 382/100 |
| 2004/0247206 A1* | 12/2004 | Kaneda | G06F 17/30271 | 382/305 |
| 2005/0078868 A1* | 4/2005 | Chen | G09B 5/065 | 382/171 |
| 2005/0091579 A1* | 4/2005 | Mewherter | G06F 17/2264 | 715/230 |
| 2005/0168590 A1* | 8/2005 | Takizawa | H04N 21/236 | 348/222.1 |
| 2006/0047637 A1* | 3/2006 | Meyerzon | G06F 17/30619 | |
| 2006/0074895 A1* | 4/2006 | Belknap | G06F 17/3074 | |
| 2008/0046837 A1* | 2/2008 | Beauchamp | G06F 3/0481 | 715/804 |

* cited by examiner

CAPTURING AND STORING ELEMENTS FROM A VIDEO PRESENTATION FOR LATER RETRIEVAL IN RESPONSE TO QUERIES

CLAIM OF PRIORITY

This application is a divisional of U.S. patent application Ser. No. 10/973,698 by Laurent Denoue, et al., entitled SYSTEM AND METHOD FOR ACQUISITION AND STORAGE OF PRESENTATIONS, filed Oct. 26, 2004 and incorporated herein by reference.

BACKGROUND OF THE INVENTION

Field of the Invention

The present invention relates generally to processing and storing images. More particularly it relates to extracting information from video presentations and storing the video presentations for later use.

Description of the Related Art

In modern business environments a greater emphasis has been placed on the transfer and exchange of information. During this time, slide-based presentations using computer presentation software such as Microsoft Power Point, web based presentations, and video presentations, have become a staple of modern business environments. However, such presentation software, while often superficially useful for presenting information to others, possesses a number of severe limitations.

Firstly, the media (e.g slides, video, audio) used in the presentation are seldom stored in a format that is easily searchable or accessible. Thus, it is often difficult for presenters and recipients of these presentations to search the content. This limitation is especially troublesome as these presentations may be the only broadly accessible documents through which certain types of gathered information are available. Additionally, such presentation software is usually unable to solicit input from the viewers of the presentation, limiting the presentation to a passive experience.

Attempts to address these problems have usually centered around additions or modifications to the presentation software. However, such modifications must be performed on a per-application basis, and in the case of soliciting input, usually require configuration on the systems of the viewers.

What is needed is an improved system for storing, organizing, and modifying presentations.

SUMMARY OF THE INVENTION

Embodiments of the present invention enable the extraction, classification, storage, and supplementation of presentation video. A media system receives a signal carrying presentation video. The media system processes the signal and generates images for slides of the presentation. The media system then extracts text from the images and uses the text and other characteristics to classify the images and store them in a database. Additionally, the system enables viewers of the presentation to provide feedback on the presentation, which can be used to supplement the presentation.

BRIEF DESCRIPTION OF THE DRAWINGS

Preferred embodiments of the present invention will be described in detail based on the following figures, wherein.

DETAILED DESCRIPTION OF THE INVENTION

Embodiments of the present invention enable the extraction, classification, storage, and supplementation of presentation video. A media system receives a signal carrying presentation video. The media system processes the signal and generates images for slides of the presentation. The media system then extracts text from the images and uses the text and other characteristics to classify the images and store them in a database.

The present system automates the process of detecting, capturing, interpreting, and storing presentations. The system can detect when a presentation is beginning and initiate a process that detects whether content is static or dynamic and stores and classifies it accordingly. The system can also modify the content for ease of organization and distribution, distribute the content to viewers in an original or modified format, and end operations when a presentation is no longer detected. The steps above can be performed without any direct user commands to start and stop operations or any user sorting/separation/organization of the media.

Figure 1:
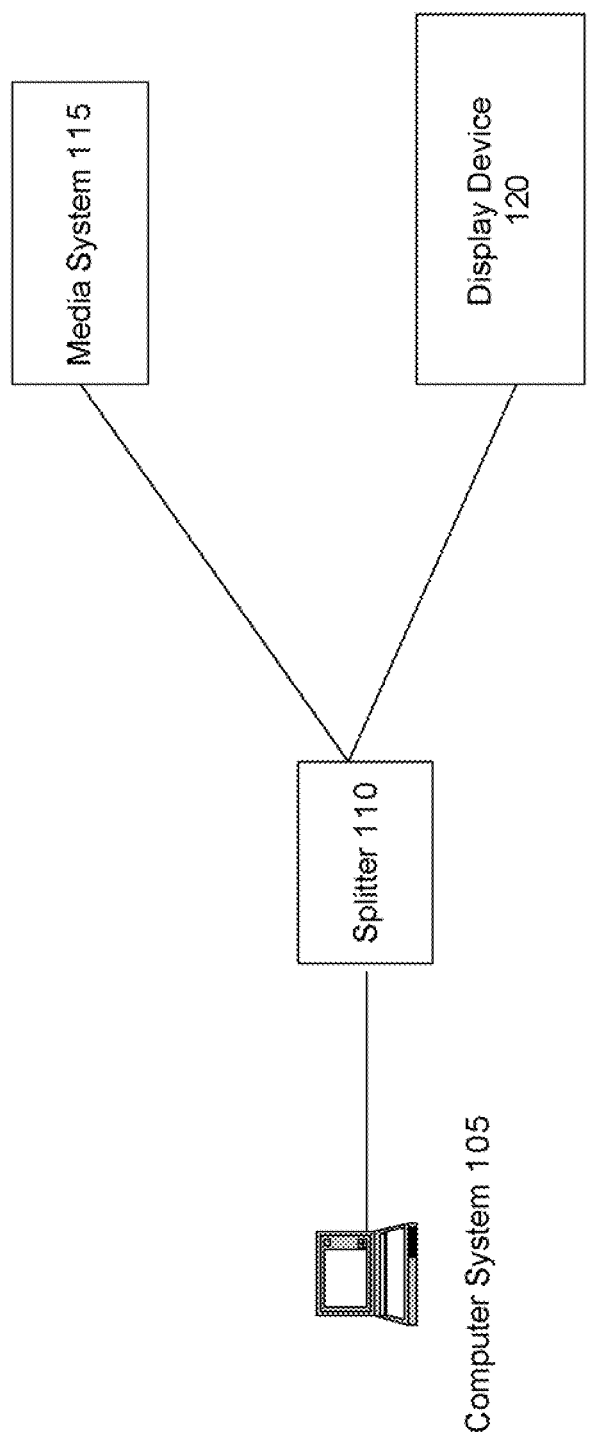
FIG. 1 is a block diagram illustrating one embodiment of interaction among a computer system, a media system, and a display device.

FIG. 1 is a block diagram illustrating one embodiment of interaction among a computer system, a media system, and a display device. A computer system 105, such as a laptop computer, desktop computer, tablet system, or any other type of computer, is connected to a video splitter 110. The computer system 105 transmits an output video signal to the splitter 110, which splits the video signal and outputs it to the media system 115 and the display device 120. The video signal can be digital or analog and can comprise any number of signal formats. The video signal can also be a data signal containing video information, such as a Virtual Network Computing (VNC) signal. The splitter can also perform conversion of a data signal to a video signal.

The display device 120 is a device used to display the video output to viewers of the presentation. The display device can be a Liquid Crystal Display (LCD) projector, analog projector, a Cathode Ray Tube (CRT) display, an LCD display or any other type of display.

The media system 115 receives the video output from the splitter 110, uses it to generate audio and video media for the presentation, and extract relevant information from the media. In some embodiments, the media system 115 is a conventional computer using specialized software, in alternate embodiments, the media system 115 is a computer specially configured to function as a media system. In some embodiments, the media system is also configured to collect audio through a microphone or other input. The audio can be stored in association with the presentation images and video.

Figure 2:
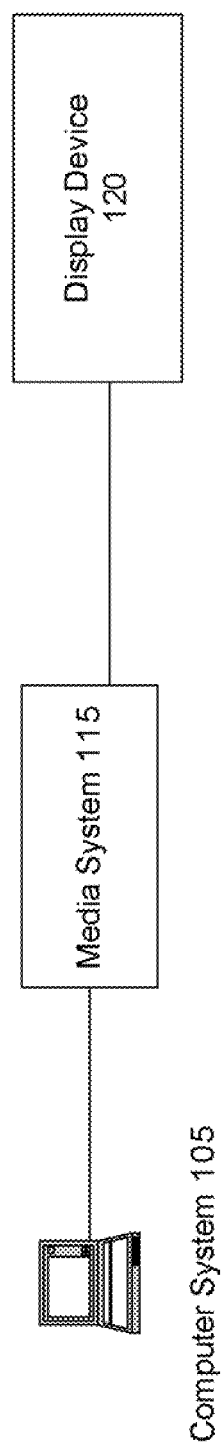
FIG. 2 is a block diagram illustrating an alternate embodiment of interaction among a computer system, a media system, and a display device.

FIG. 2 is a block diagram illustrating an alternate embodiment of interaction among a computer system, a media system, and a display device. In the present embodiment, the media system 115 sits between the computer system and the display device 120. In this embodiment, the media system processes the video signal, generates slide images and displays the generated slide images on the display device 120. The media system 115 may also accept image overlays and supplements, or other modifications, and output them to the display device 120. Alternately, the overlays can be generated by an automatic agent such as a translator program that automatically translates the text of the presentation. The media system 115 can also include a "pass-through" mode where the input video signal is passed directly, without modification, to the output device 120.

Figure 3:
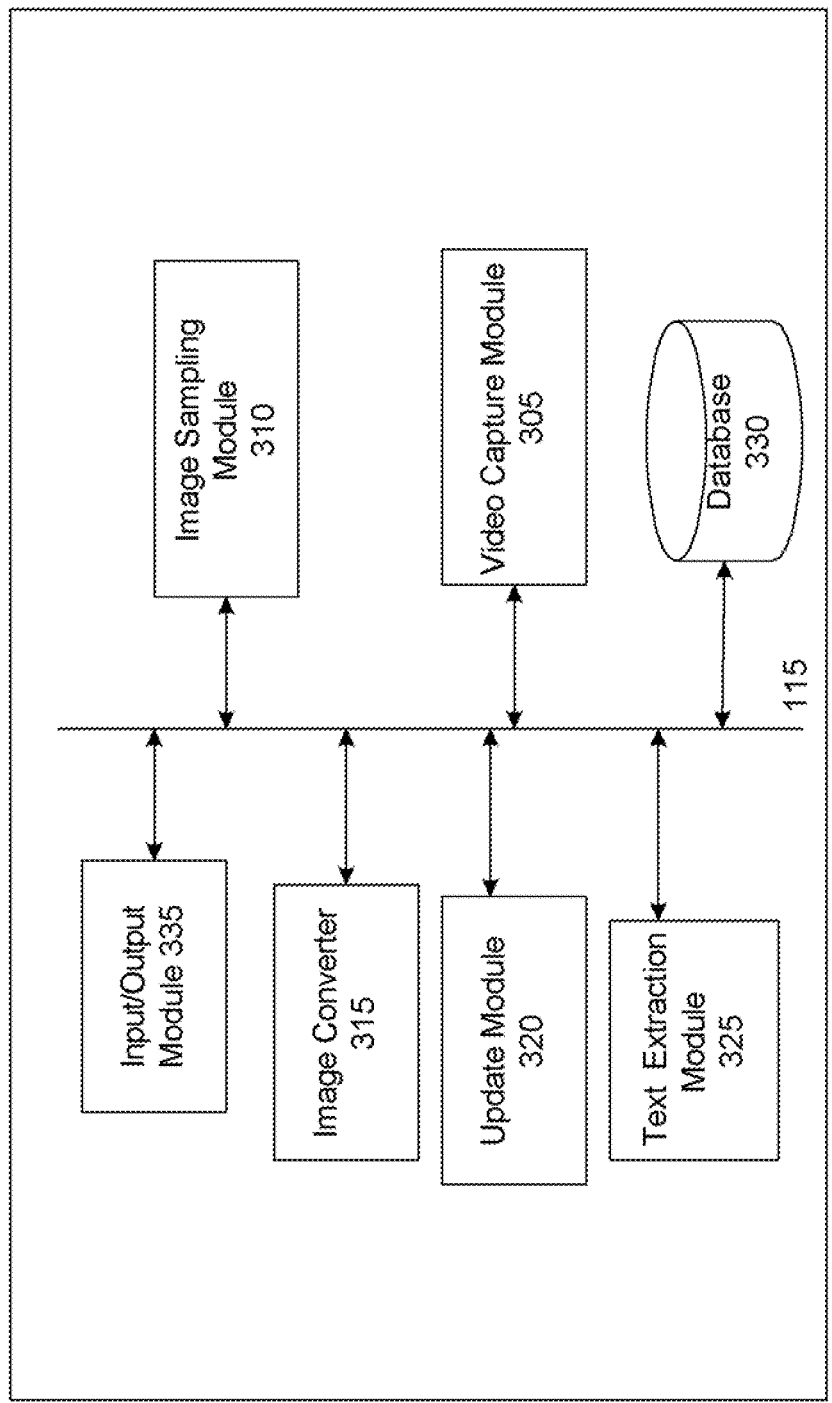
FIG. 3 is a block diagram illustrating a closer view of a media system in accordance with one embodiment of the present invention.

FIG. 3 is a block diagram illustrating a closer view of a media system 115 in accordance with one embodiment of the present invention. The media system 115 includes a video capture module 305, an image sampling module 310, an image converter 315, an update module 320, a text extraction module 325, a database 330, and an input/output module 335. These components may be implemented through any combination of hardware, software, and firmware.

The video capture module 305 receives the video signal from the splitter 110 or computer system 105. The image sampling module 310 generates slide images from the video captured by the video capture module. In one embodiment, the image sampling module detects if a particular image has been broadcast steadily for a predetermined amount of time and treats it as a single slide. Alternately, continuous video is recorded in full. If the sampling module 310 determines that the image is a slide it generates a bitmap for the image. If it determines that the media is video, a video recording of either the whole capture or a segment of the window that contains video, is captured.

The image converter 315 may optionally convert the bitmap to a more size efficient format such as JPEG or another format. An update module 320 is configured to generate categorization information for media and to store the media, with the categorization information, in the database 330. In some embodiments, the update module 320 first utilizes the text extraction module 325, which detects text in the image and provides the text to the update module.

The categorization information can include date/time information for the presentation, an identifier for the particular presentation being shown, characteristics of the image, supplemental information received from either the presenter or the viewers, and text within the image. Some categorization information is generated after the presentation has been recorded while some categorization information is generated in real time.

The input/output module 335 is used to generate an interface for configuring the media system 115. The interface can be a console interface on the media system 115 itself, graphical user interface that is accessed through input/output devices such as a keyboard and monitor that are connected to the media system, or a web interface that is accessed over a network. The input/output module 335 can also be used to transmit overlays and video supplements to the media system 115, which uses the overlays to modify the image. In one embodiment, the input/output module comprises a web server running on the media system 115. By viewing an interface page on the web server, viewers of the presentation can submit questions and comments as overlays for the presentation. The web server can also be used as an interface for submitting search queries for images stored in the database 330.

Figure 4:
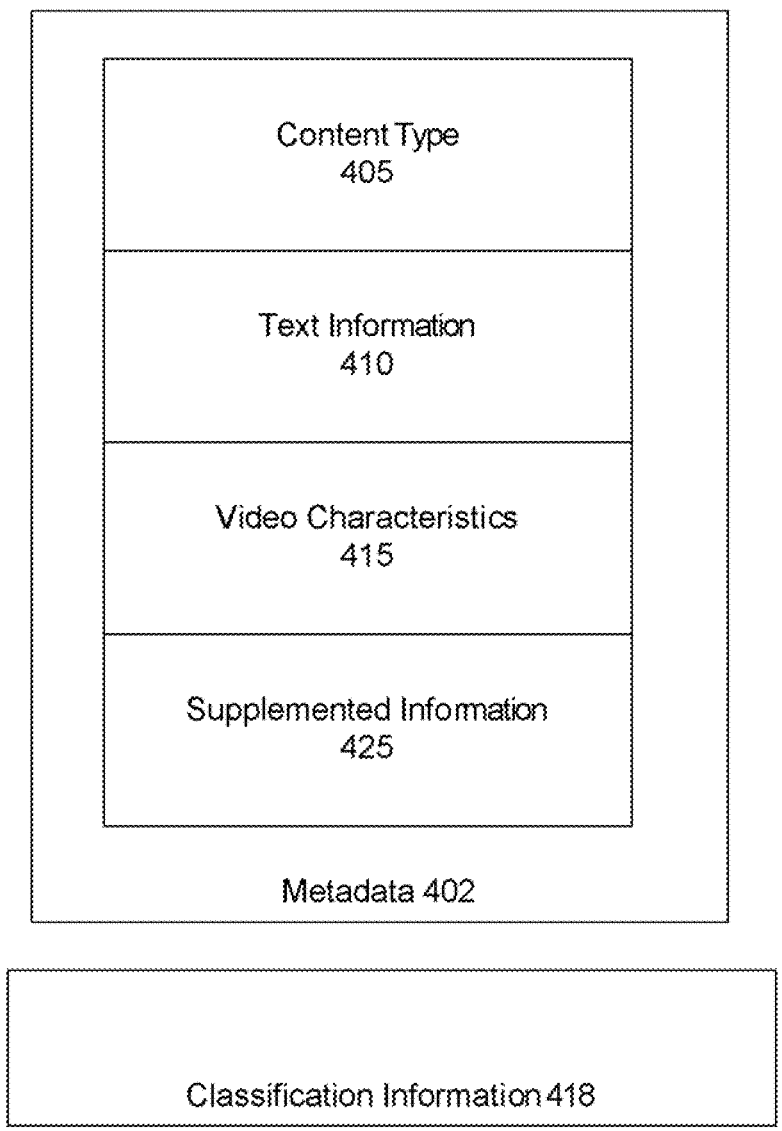
FIG. 4 is a block diagram illustrating one embodiment of categorization information for stored video.

FIG. 4 is a block diagram illustrating one embodiment of categorization information 400 for stored media. The categorization information 400 includes metadata 402 and classification information 418. The metadata 402 is preferably stored in association with the media and is generated when the media is first captured. The classification information 418 can be stored in association with the media or centrally. The classification information 418 is often generated after a presentation rather than in real-time. The metadata includes content information 405. The content information indicates whether the stored video comprises a single slide image, a video clip containing continuous video, audio, or some other type of media.

The metadata additionally includes text information 410. The text information 410 includes text that has been extracted from the slide image by the text extraction module 325. The information can include all of the text or particular key words that were designated as representative words for searches. The text information 410 can include weights or other information indicating the importance of particular text in the slides. For example, the text extraction module 325 can be programmed to recognize title text or section headings and give that text greater importance in classifying the slide image.

The metadata additionally includes video characteristics 415. The video characteristics include image characteristics that are extracted from the slide image. These can include colors or distinctive shapes or other image qualities. The metadata additionally includes supplemented information 425. The supplemented information includes overlays and other information that is provided by a presenter, automatic agent, or the audience during a presentation.

The classification information 418 can include an identifier for the presentation from which the image is extracted. It may also include time and date information for the presentation. For example, all of the video or slides for a single presentation would include the same identifier within the classification information 418. Presentation data can also be grouped by meeting or day with all of the presentation data for a single meeting or day classified associatively. Artificial categorizations that associate presentations that are related in other ways can also be added.

The categorization information 400 can be used by an associated search utility to retrieve presentation content in response to submitted search requests. Users of the search utility can search according to content or organizational data (i.e. when a presentation was shown, content shown at a meeting or presentation) and the search utility will return media, complete presentations, or sections of presentations matching the search request.

Figure 5:
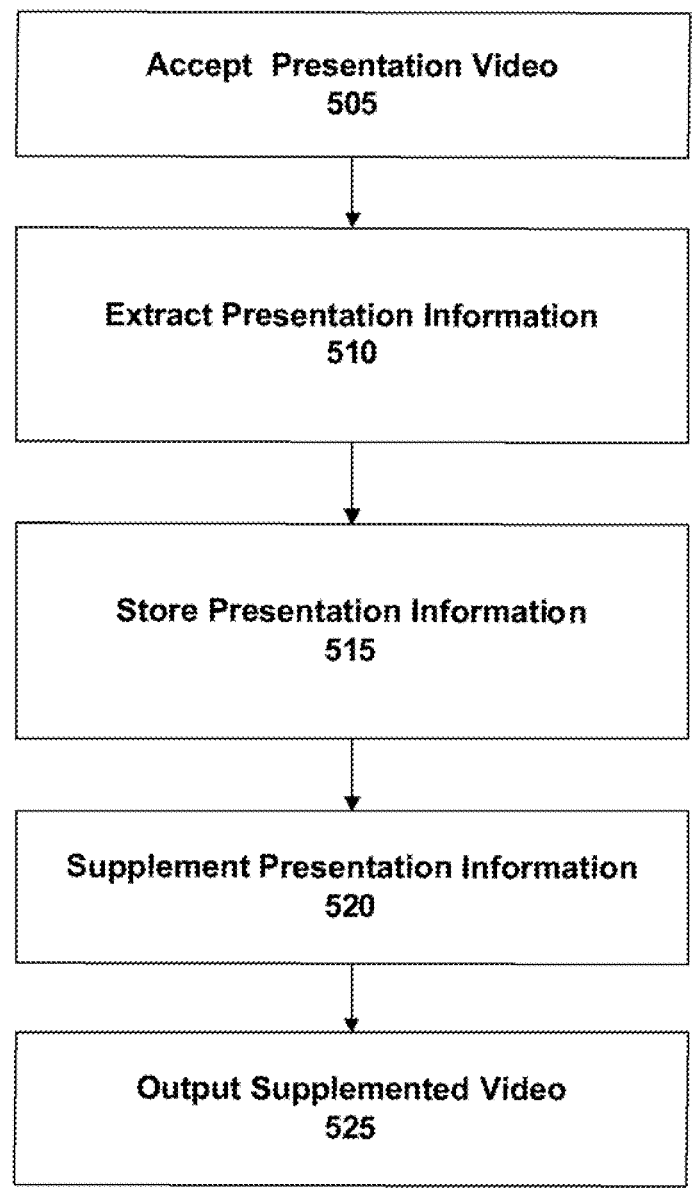
FIG. 5 is a flow chart illustrating a process for handling presentation video input from a computer system.

FIG. 5 is a flow chart illustrating a process for handling presentation video input from a computer system. In step 505, the media system 115 accepts presentation video and/or audio, preferably through the video capture module 305. In some embodiments, the system can detect when a presentation has begun by analyzing an incoming video stream and detecting characteristics indicative of a presentation. This process can also be used to stop recording when the detected video characteristics indicate that a presentation is no longer being transmitted. In step 510, the media system extracts the presentation information. This step includes the determination of what type of media is being presented, the extraction of slide images or video streams from the video, the conversion of the slide images to JPEGs, and the extraction of text from the image. This step is described in greater detail with respect to FIG. 6. This step may also include the extraction of video streams and audio streams. This step can also include analysis of audio content, for changes in volume, detection of words through speech to text extraction, and any other useful or relevant characteristics of the audio. Audio content can be classified according to characteristics of the audio, characteristics of video detected at the same time, or both.

The system can use a variety of methods for categorizing the input received from the video signal and categorizing it accordingly. Usually the system will analyze a predetermined number of consecutive frames and categorize it appropriately. In one embodiment, the system detects a slide or other stable presentation by detecting unchanging video frames for more than a predetermined amount of time.

Video can be detected in a similar manner. In one embodiment, the system computes the difference between a series of consecutive frames. The system checks for a region in the series of frames in which the frames are always changing (the difference between successive frames is not null). If it finds a region that changes continually it determines that a video clip is playing. In some embodiments, the system can crop the sections of the frames that are not changing. In alternate embodiments, the entire frame is cropped.

In step 515, the media, which can include video, slides, or audio, is stored in association with the presentation information of FIG. 4. In step 520 the presentation information is supplemented with overlays. These overlays can be received from the presenter, an automatic agent, or the audience through the web server generated by the input/output module. In one embodiment, the presenter can accept questions from audience members through a network interface. The questions can be overlayed on the slide image. In step 520, the supplemented image is output to the display device 120.

Figure 6:
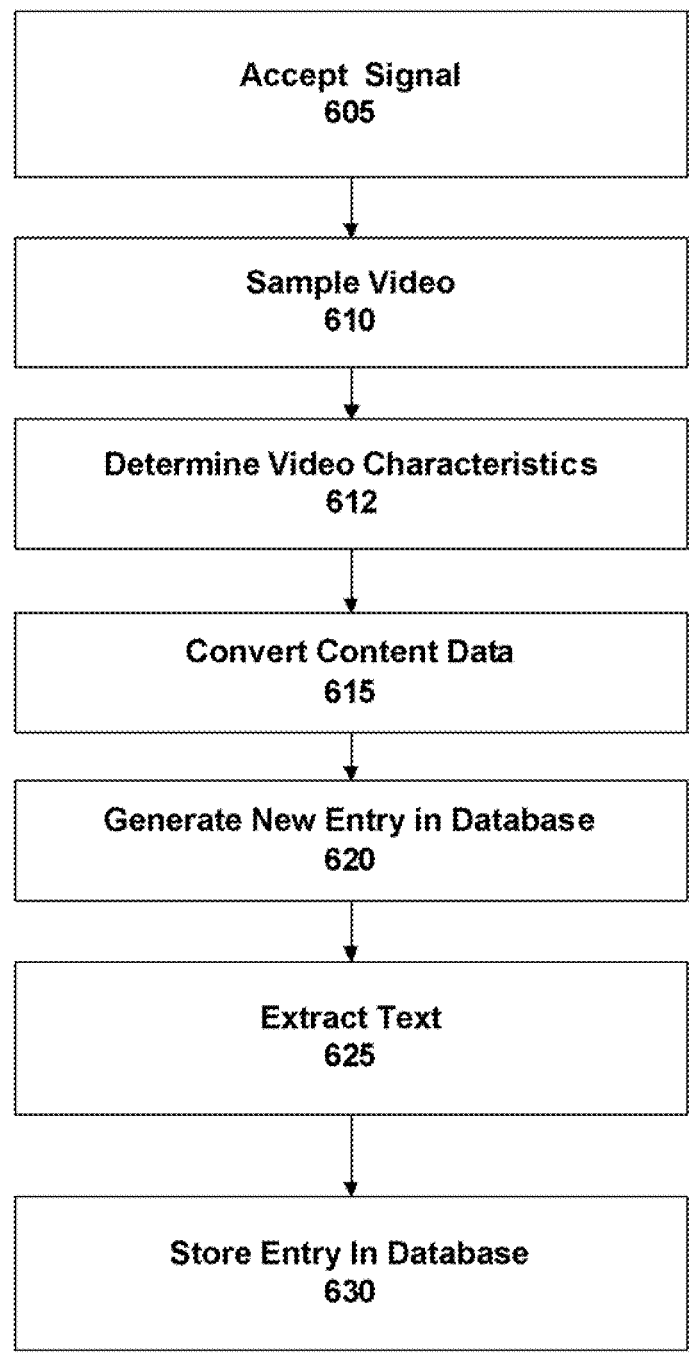
FIG. 6 is a flow chart illustrating a process for categorizing and storing video input.

FIG. 6 is a flow chart illustrating a process for categorizing and storing video input. In step 605 the system accepts media input. In one embodiment, the media input is received through the video capture module 305. In step 610, the image sampling module 310 extracts content from the video stream. In step 612, the image sampling module 612 determines a type for the content. For example, video clips can be identified if a section of the image changes continuously and stored as continuous segments. In one embodiment, the image sampling module 310 checks for images that are displayed continuously for a predetermined amount of time, designates those images as static images, and generates bitmaps for the images. The system can apply other criteria as well. In one embodiment, the font size of any text in the image is used, with larger text indicating a greater likelihood that the image is a slide. During this step the image sampling module can also extract audio from the media stream, to be stored in association with video or images captured concurrently.

In step 615 the image converter 315 converts the content to more compact format, such as GIF or JPEG for images, or MPEG for video. This step is optional, and in some embodiments, the image is stored in an uncompressed form. In step 620, the update module 320 generates a new entry in the database 330. The entry is created with initial categorization information such as the content type 405 for the media and video characteristics 415.

In step 625, the update module 320 utilizes the text extraction module 325 to extract text from the image or video. The text can include weights or other information indicating the importance of particular text in the slides. For example, the text extraction module 325 can be programmed to recognize title text or section headings and give that text greater importance in classifying the content. In step 630, the content is stored in the database 330. This step also entails adding the extracted text and any other supplemental information.

Figure 7:
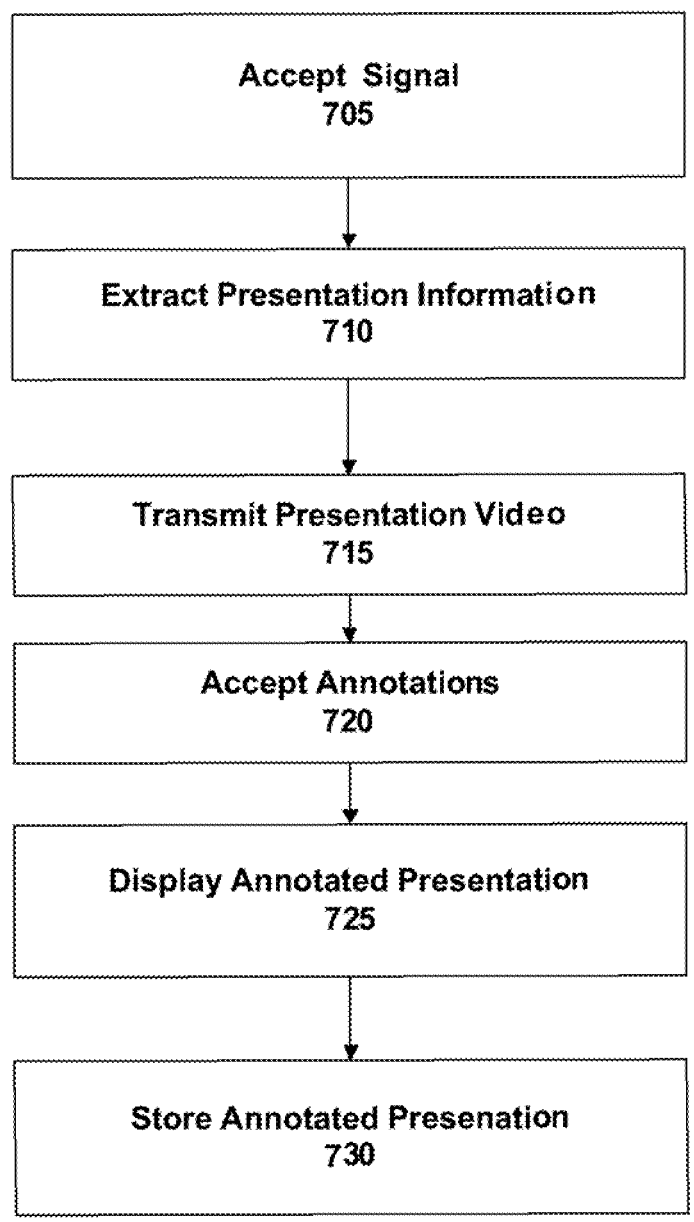
FIG. 7 is a flow chart illustrating a process for supplementing presentations with user input.

FIG. 7 is a flow chart illustrating a process for supplementing presentations with user input. In step 705, the video signal is received by the video capture module 305. In step 710, the presentation video is transmitted to the viewers of the presentation. In some embodiments, the media system 115 transmits special presentation display information over a network connection, which is received by the viewers at their terminals or computers, and is processed and displayed by an application on the recipients' computers. In step 720 the media system, through the input/output module 335 accepts annotations from either the viewers or the presenter. The annotations can be comments or supplemental overlays (drawings added to the slides through a mouse or writing tool). Alternately, the annotations can be questions or comments transmitted from the viewers. In some embodiments, the questions or comments are displayed in a preset section of the image.

In step 725 the annotated presentation is displayed. In some embodiments, the annotations are displayed in real time. In alternate embodiments, the annotations are collected during the presentation and displayed when the presenter returns to an earlier stage of the presentation.

In step 730, the slide image is stored in the database 330 with the annotations stored in the supplemented information 425.

Figure 8:
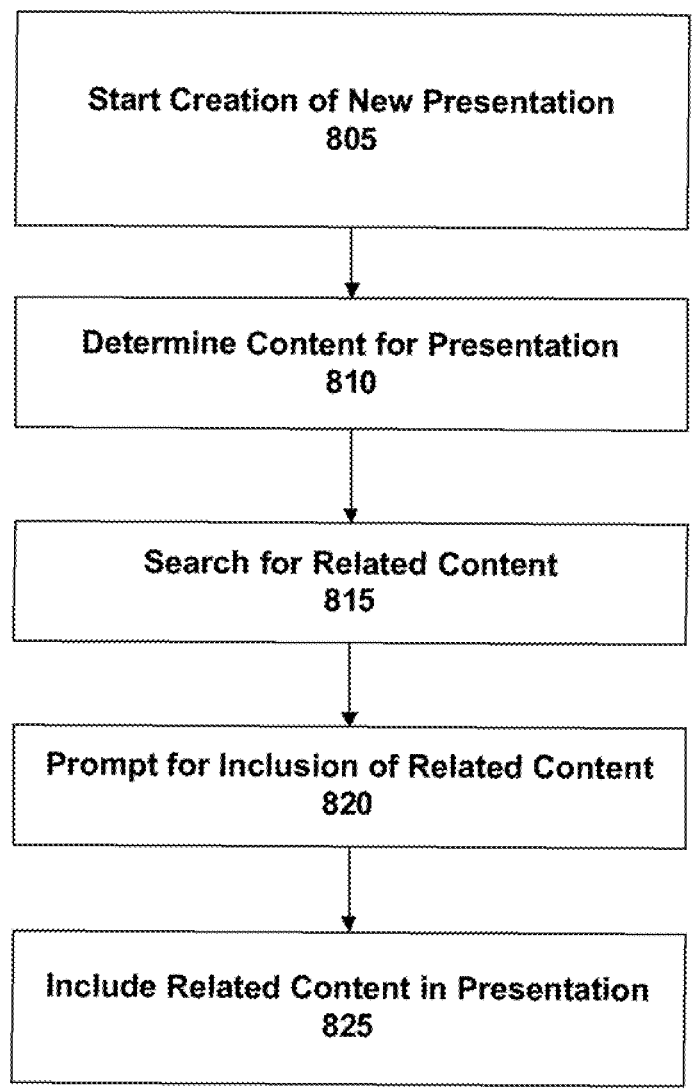
FIG. 8 is a flow chart illustrating a process for utilizing stored content in new presentations.

FIG. 8 is a flow chart illustrating a process for utilizing stored content in new presentations. In step 805 a user starts creation of a new slide presentation. In some embodiments, this presentation is generated on the computer system 105. An application module on the computer system, either as part of the presentation generation program, or independently, is configured to detect the creation of a new presentation. The application module is configured to access the database 330 on the media server 115. In step 810, the application module, according to the text input in the presentation determines search terms for the presentation. In step 815, using the search terms, the application searches the database 330 for related content, cross-referencing the search terms with the identification information described in FIG. 4. In step 820, the system provides images matching the search term and prompts a user to include them.

In step 825, responsive to user acceptance, the search terms are included in the presentation.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for capturing video presentations, the method comprising:
    detecting, performed by one or more microprocessors, when a video presentation has begun by analyzing an incoming video stream;
    determining whether a presentation element in the video presentation is static or dynamic in response to detecting that the video presentation has begun;
    generating an image from the presentation element when the presentation element is static;
    generating a video clip from the presentation element when the presentation element is dynamic;
    extracting textual content of the presentation element from the image;
    associating a plurality of weights with a plurality of text of the textual content of the presentation element based on types of the plurality of text such that a first weight is associated with a first text of the plurality of text that is not a title of the presentation element and a second weight is associated with a second text of the plurality of text of the presentation element, the second weight being greater than the first weight and associated with the second text in response to determining that the second text is a title of the presentation element, the first text and the second text being weighted textual content;
    receiving supplemental content corresponding to the image or the video clip;
    storing the weighted textual content and the supplemental content in a searchable index;
    detecting when the video presentation has stopped by analyzing the incoming video stream; and
    stopping the generation of the video clip and the image in response to detecting that the video presentation has stopped,
    wherein in response to the extracted textual content associated with the image, stored in the searchable index, matching a search query:
        audio content is extracted from the generated video clip, and
        the audio content associated with the image is played and returned in response to the search query.

2. The method of claim 1, wherein the generated image from the presentation element comprises a slide image bitmap.

3. The method of claim 1, wherein when at least one of the extracted textual content associated with the image, stored in the searchable index, matches a search query, the image is displayed and returned in response to the search query.

4. The method of claim 1, wherein the generated video clip is extracted from the incoming video stream.

5. The method of claim 1, wherein the audio content is extracted from the incoming video stream.

6. The method of claim 1, wherein the method is performed by the one or more microprocessors.

7. The method of claim 1, wherein the type of types of the plurality of text comprise section heading text, title text and body text.

8. The method of claim 1, wherein the receiving the supplemental content corresponding to the image or the video clip comprises receiving a user comment or a user question.

9. The method of claim 1, further comprising associating the video presentation with a plurality of other video presentations in response to determining that the video presentation and the other video presentations are presented on a same day.

10. The method of claim 1, further comprising associating the presentation element with an overlay requesting display over the presentation element and received over a network connection while the presentation element is displayed.

11. A non-transitory computer readable storage medium storing a program causing a computer to execute a process for capturing video presentations, the process comprising:
    detecting, performed by one or more microprocessors, when a video presentation has begun by analyzing an incoming video stream;
    determining whether a presentation element in the video presentation is static or dynamic in response to detecting that the video presentation has begun;
    generating an image from the presentation element when the presentation element is static;
    generating a video clip from the presentation element when the presentation element is dynamic;
    extracting textual content of the presentation element from the image;
    associating a plurality of weights with a plurality of text of the textual content of the presentation element based on types of the plurality of text such that a first weight is associated with a first text of the plurality of text that is not a title of the presentation element and a second weight is associated with a second text of the plurality of text of the presentation element, the second weight being greater than the first weight and associated with the second text in response to determining that the second text is a title of the presentation element, the first text and the second text being weighted textual content;
receiving supplemental content corresponding to the image or the video clip;
storing the weighted textual content and the supplemental content in a searchable index;
detecting when the video presentation has stopped by analyzing the incoming video stream; and
stopping the generation of the video clip and the image in response to detecting that the video presentation has stopped,
wherein in response to the extracted textual content associated with the image, stored in the searchable index, matching a search query:
  audio content is extracted from the generated video clip, and
  the audio content associated with the image is played and returned in response to the search query.

* * * * *